US005522085A

United States Patent [19]
Harrison et al.

[11] Patent Number: 5,522,085
[45] Date of Patent: May 28, 1996

[54] ARITHMETIC ENGINE WITH DUAL MULTIPLIER ACCUMULATOR DEVICES

[75] Inventors: Calvin W. Harrison; Susan L. Gilfeather; John B. Gehman, Jr., all of Scottsdale, Ariz.

[73] Assignee: Motorola, Inc., Schaumburg, Ill.

[21] Appl. No.: 394,054

[22] Filed: Feb. 24, 1995

Related U.S. Application Data

[63] Continuation of Ser. No. 170,145, Dec. 20, 1993.
[51] Int. Cl.⁶ ..................................... G06F 7/52
[52] U.S. Cl. .................. 395/800; 364/754; 364/736; 364/736.5; 364/768
[58] Field of Search ..................... 395/800; 364/DIG. 1, 364/726, 754, 724, 744, 736; 382/41

[56] References Cited

U.S. PATENT DOCUMENTS

| | | | |
|---|---|---|---|
| 4,604,721 | 8/1986 | Gray | 364/726 |
| 4,768,159 | 8/1988 | Gray et al. | 364/726 |
| 4,802,111 | 1/1989 | Barkan et al. | 364/724.1 |
| 4,868,776 | 9/1989 | Gray et al. | 364/766 |
| 4,876,660 | 10/1989 | Owen et al. | 364/754 |
| 5,175,702 | 12/1992 | Beraud et al. | 364/736 |
| 5,220,525 | 6/1993 | Anderson et al. | 364/760 |
| 5,278,781 | 1/1994 | Aono et al. | 364/736 |
| 5,329,283 | 7/1994 | Smith | 342/25 |
| 5,379,351 | 1/1995 | Fandrianto et al. | 382/41 |

OTHER PUBLICATIONS

"LH9124 Digital Signal Processor" from SHARP Data Sheet, (Ref. Code SMT90033) Jul. 1992.
An article entitled "LH9320 DSP Address Generator" from SHARP Data Sheet, (FDS–Rev. A,Sep. 30, 1992).
An article entitled "LH9124 Digital Signal Processor" from SHARP Data Sheet, (Ref. Code SMT90033 Jul. 1992).
An article entitled "Frequency Domain Array Processor, A66540A/4K, 16K, 64K, A66540B/4K, 16K, 64K", from Preliminary User's Guide, Revision Mar. 1991 (Array Microsystems, 1420 Quail Lake Loop, Colorado Springs, CO 80906).
An article entitled "A 300–MOPS Video Signal Processor with a Parallel Architecture" by Toshihiro Minami, Ryota Kasai, Yamauchi, Yutaka Tashiro, Jun–ichi Takahashi and Shigeru Date, from IEEE Journal of Solid–State Circuits, vol. 26, No. 12, (Dec. 1991).

*Primary Examiner*—Alyssa H. Bowler
*Assistant Examiner*—Walter D. Davis, Jr.
*Attorney, Agent, or Firm*—Bradley J. Botsch, Sr.; Jeffrey D. Nehr

[57] ABSTRACT

An arithmetic engine includes a first dual multiplier accumulator (MAC) for receiving input data and for producing first dual MAC output data. A second dual MAC is coupled in parallel to the first dual MAC. The second dual MAC receives the input data and produces second dual MAC output data. An adder array is coupled to both the first dual MAC and to the second dual MAC. The adder array receives the input data, the first dual MAC output data, and the second dual MAC output data and produces arithmetic engine output data. Each dual MAC comprises a multiplier cross point switch, multiplier registers, a register selector, and parallel multipliers. Each adder array comprises a cross point switch, adder registers, a register selector, adder, and condition code determiner.

12 Claims, 5 Drawing Sheets ically efficient because of size and power limitations.

ARITHMETIC ENGINE WITH DUAL MULTIPLIER ACCUMULATOR DEVICES

This application is a continuation of prior application Ser. No. 08/170,145, filed Dec. 20, 1993.

FIELD OF THE INVENTION

This invention relates in general to digital signal processing and in particular to arithmetic engines for such applications.

BACKGROUND OF THE INVENTION

High speed digital signal processing (DSP) in communication system applications require low power implementations of high performance DSP capabilities, especially for hand held devices. These DSPs must be capable of efficiently performing the spectral analysis and digital filtering required for hand-held spread spectrum communication equipment, high speed modems and all digital radios. These applications require matrix math operations, complex arithmetic operations, Fast Fourier Transform (FFT) calculations, encoding/decoding, searching and sorting. Optimization requires that the DSP arithmetic engine use many resources efficiently. For example, for execution of the complex multiply operation:

$$(x1+iy1)(x2+iy2)=(x1x2-y1y2)+i(x1y2+y1x2)$$

four real multiplications and two real additions are required to perform this operation in one instruction. More multipliers and adders would not improve the speed, less would require more instructions.

What is needed is a high performance arithmetic engine that can be optimized to perform higher radix FFTs, complex multiplication and high speed data sorting. Higher radix FFTs require less memory accesses because intermediate results are stored in registers in the arithmetic engine. The throughput is therefore faster because the arithmetic engine can be pipelined. A radix 8 4096 point FFT requires ⅔ less data fetches than a radix 2 FFT and ⅓ less than a radix 4. The complex multiply is the basis for most DSP algorithms and is therefore an important performance target. Sorting is required to do statistical filtering and interpret results. Sorting can determine the location of peaks, depressions and statistically variant data which are typical signal analysis objectives. Such an arithmetic engine requires many resources which must be used efficiently because of size and power limitations.

Typical arithmetic engines for general purpose DSPs include one multiplier and one adder referred to as a multiplier-accumulator (MAC). Arithmetic engines of DSPs that are more application specific can contain an array of several multipliers and adders. The arithmetic engines of the latter DSPs are typically optimized to perform a Radix-4 butterfly and cannot do high speed sorting.

Typical arithmetic engines are also not capable of efficiently handling the arithmetic computations required for all digital communications applications. General purpose DSPs are capable of performing Radix 2 butterflies efficiently but can not do higher radix butterflies because they do not have sufficient resources. The FFT requires many complex multiplications, and each complex multiply requires four real multiplications and two real additions. Since general purpose DSPs have only one MAC, it takes four passes through the arithmetic engine of such a DSP to perform just one complex multiply. Engines which have more than one MAC usually limit the resources to Radix 4 butterfly operations.

Typical arithmetic engines are also not capable of handling high speed data sorting. A typical data sort requires comparison of two pieces of data which results in a condition code. The condition code is passed to the execution unit which then causes the program to branch in one of two paths on a subsequent instruction. The next instruction after the branch moves the data to its new location based on the results of the data comparison. This method requires a minimum of three instructions and can only operate on one data pair at a time. Typical arithmetic engines do not have sufficient data path switching to perform hardware sorts on multiple data pairs.

SUMMARY OF THE INVENTION

Accordingly, it is an advantage of the present invention to provide a new and improved arithmetic engine. It is an additional advantage that the arithmetic engine operates on complex data in ordered pairs and is optimized for Radix 8 processing. It is still a further advantage of the invention that the arithmetic engine provides high speed data sorting, using full computing resources by recirculating data within the engine by feeding outputs back to inputs.

To achieve these advantages, an arithmetic engine is contemplated which includes a first dual multiplier accumulator (MAC) for receiving input data at a first dual MAC first input and for producing first dual MAC output data at a first dual MAC output. A second dual MAC is coupled in parallel to the first dual MAC. The second dual MAC receives the input data at a second dual MAC first input and produces second dual MAC output data at a second dual MAC output. An adder array is coupled to both the first dual MAC and to the second dual MAC. The adder array is for receiving the input data, the first dual MAC output data, and the second dual MAC output data and for producing arithmetic engine output data at an adder array output.

The above and other features and advantages of the present invention will be better understood from the following detailed description taken in conjunction with the accompanying drawings.

DETAILED DESCRIPTION OF THE DRAWINGS

Generally, the present invention provides an arithmetic engine apparatus optimized for complex arithmetic processing. While the arithmetic engine described is well suited for DSP applications, the use of such an arithmetic engine is not limited to DSP or complex arithmetic processing. The arithmetic invention may be accomplished by having two dual MACs in parallel, each connected to an adder array. Each dual MAC can perform two multiplies and two addition operations simultaneously and can also sort its input data. The adder array can perform six addition operations simultaneously and is also capable of performing sorting and storing of peak values of input data.

Figure 1:
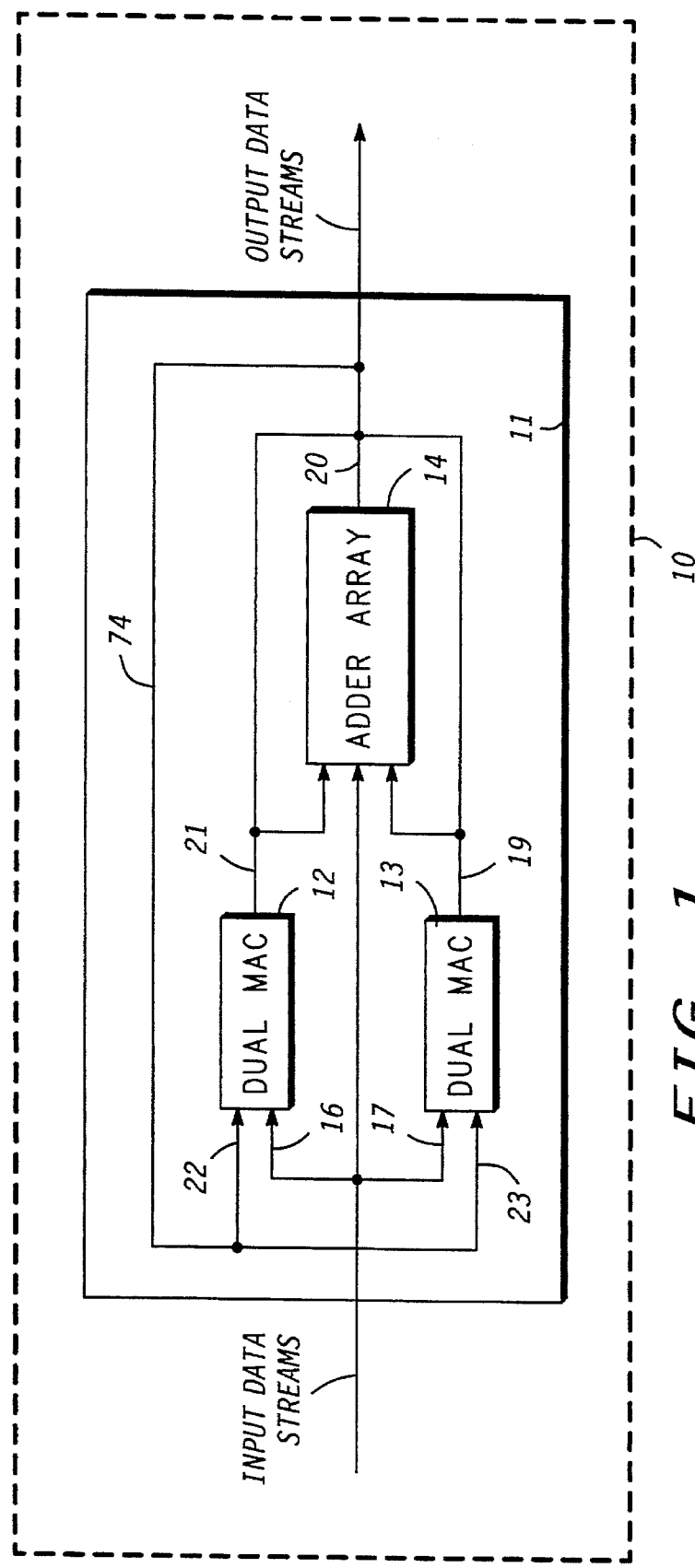
In FIG. 1, there is shown a schematic of an arithmetic engine in a complex arithmetic processor (CAP) or a DSP in accordance with a preferred embodiment of the invention.

The present invention can be more fully understood with reference to the figures. FIG. 1 illustrates a arithmetic engine 11 within a complex arithmetic processor (CAP) or digital signal processor (DSP) 10. The arithmetic engine 11 includes a dual multiplier accumulator (dual MAC) 12, a dual MAC 13, and an adder array 14. The adder array 14 is coupled to the parallel combination of dual MACs 12 and 13. First dual MAC first input 16 and second dual MAC first input 17 are input lines that provide data to the dual MACs from the input data streams. First dual MAC second input 22 and second dual MAC second input 23 are input lines that can provide data to the respective dual MACs either from the input data streams, or from the adder array via first adder pair output data 74. First adder pair output data 74 is a sub-set of the output of the adder array 20. First dual MAC outputs 21 and second dual MAC outputs 19 are outputs of dual MAC 12 and dual MAC 13, respectively. These dual MAC outputs are inputs to the adder array 14 and are elements of the output data streams. The adder array 14 can also receive data directly from the input data streams.

Figure 2:
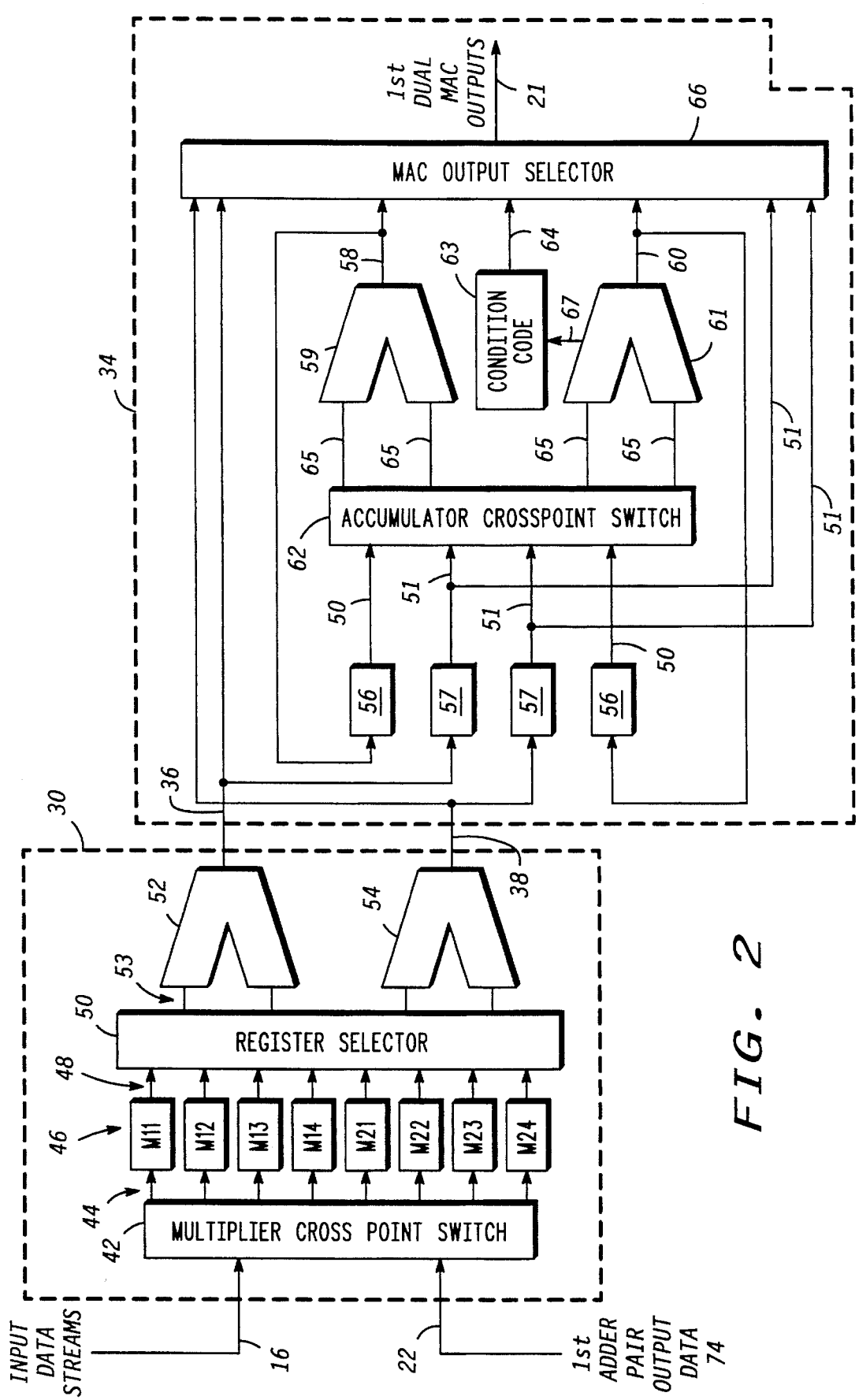
In FIG. 2, them is shown a schematic of a dual multiplier accumulator (MAC) suitable for use in the arithmetic engine shown in FIG. 1.

FIG. 2 illustrates a schematic of a dual MAC suitable for use in the arithmetic engine in FIG. 1. The dual MAC in FIG. 2 describes specifically the dual MAC 12 in FIG. 1 by showing the inputs as first dual MAC first input 16, first dual MAC second input 22, and the output as first dual MAC outputs 21. FIG. 2. could represent dual MAC 13 in FIG. 1 if first dual MAC first input 16 and first dual MAC second input 22 were replaced by second dual MAC first input 17 and second dual MAC second input 23, respectively. The output consisting of first dual MAC outputs 21 would, in such a case, be replaced by second dual MAC outputs 19.

The dual MAC in FIG. 2 includes a dual multiplier 30 and a dual accumulator 34. The dual multiplier 30 comprises a multiplier cross point switch 42, multiplier registers 46, register selector 50, first parallel multiplier 52 and second parallel multiplier 54. The cross point switch 42 allows any combination of inputs to be loaded into the multiplier registers 46 simultaneously. These registers are coupled to the register selector 50 which directs the appropriate multiplier register values 48 to both the first parallel multiplier 52, and second parallel multiplier 54. The outputs of the multipliers are coupled to both the MAC output selector 66 and the adder input registers 57 of the dual accumulator 34.

Dual accumulator 34 comprises accumulator registers 56, adder input registers 57, an accumulator crosspoint switch 62, first MAC adder 59, second MAC adder 61, condition code 63, and MAC output selector 66. The accumulator registers 56 are used to store the sum of previous MAC adder outputs which are first accumulator output 58 and second accumulator output 60 in FIG. 2. The adder input registers 57 are used to store the outputs of the first and second parallel multiplier outputs 36 and 38 of the dual multiplier 30. Both the accumulator registers 56 and the adder input registers 57 are coupled to the accumulator crosspoint switch 62. The adder input registers 57 are also coupled to the MAC output selector 66. The accumulator crosspoint switch 62 directs combinations of its inputs to both the first MAC adder 59 and the second MAC adder 61. If the dual accumulator 34 is in accumulate mode, the outputs of the first and second MAC adders 59 and 61 are feedback to the accumulator registers 56 to store their outputs. The first and second MAC adders 59 and 61 are also coupled to the MAC output selector 66. The second MAC adder 61, which can also be used as a subtractor, is also coupled to the condition code 63. The condition code 63 determines which of the second MAC adder 61 inputs is greater and uses this information to control the MAC output selector 66 which is coupled to its output. The MAC output selector 66 receives data from the first and second parallel multiplier outputs 36 and 38, the adder input register values 51, and from the first and second accumulator output 58 and 60. The current mode of the dual MAC determines which of these outputs to send out on the first dual MAC outputs 21 in FIG. 2. If the dual MAC is in the sort mode, the condition code output 64 is used to determine the appropriate order for the output of the adder input register values 51 on the first dual MAC outputs 21.

To explain the workings of the FIG. 2 representation in further detail, data can enter the multiplier cross point switch 42 from the input data streams or from the first adder pair output data 74. The input data streams consist of data pairs that come from the complex arithmetic processor memories. The first adder pair output data 74 comes from the first rank of adders inside the adder array 14. The input data streams and the first adder pair output data enter the multiplier cross point switch 42 via the first dual MAC first input 16, and the first dual MAC second input 22, respectively. The multiplier cross point switch 42 routes the input data to the multiplier registers 46 as selected sources 44. The cross point switch 42 is capable of moving multiple input values to multiple multiplier registers simultaneously. The register selector 50 receives the multiplier register values 48 from the multiplier registers 46 and sends the appropriate values to the first and second parallel multipliers 52 and 54 as selected multiplier operands 53. The first and second parallel multipliers 52 and 54 multiply their respective inputs and output their results on first parallel multiplier output 36 and second parallel multiplier output 38. If the dual MAC is in bypass mode, these outputs are sent directly to the MAC output selector 66 where they are sent out of the dual MAC via first dual MAC outputs 21. If the dual MAC is in arithmetic mode, the first multiplier output 36 and the second multiplier output 38 are sent to the dual accumulator 34 and stored in the adder input registers 57.

After data is stored in the input registers 57 in FIG. 2, several things can happen. If the dual MAC is in arithmetic mode, the accumulator crosspoint switch 62 takes the two adder input registers values 51 and sends them both to the first MAC adder 59 and the second MAC adder 61 via the selected adder inputs 65. In such a case, the second MAC adder 61 is being used as a subtractor, resulting in the sum and difference of the two values. The sum and difference appear on the first accumulator output 58 and the second accumulator output 60, respectively, and enter the MAC output selector 66, before exiting the dual MAC via the first dual MAC outputs 21.

When the dual MAC in FIG. 2 is in the sort mode, the sum and difference of the adder input registers 57 are calculated as described above. The condition code 63 inputs the result from the second MAC adder 61 via the condition code input 67 (still being used as a subtractor), and determines which of the two adder input register values 51 was greater. A decision is sent to the MAC output selector 66 via the condition code output 64. The decision is then used by the MAC output selector to determine how to arrange the adder input register values 51 on the first dual MAC output 21. The largest and smallest values will always appear in the same location on the first dual MAC outputs 21.

When the dual MAC in FIG. 2 is in the accumulator mode, the accumulator crosspoint switch 62 uses the adder input register values 51 and the accumulator register values 50 as inputs. A top pair is sent to the first MAC adder 59 and a bottom pair is sent to the second MAC adder 61. In the accumulate mode, the second MAC adder 61 is used as an adder and not a subtractor. The respective outputs of each of the first and the second MAC adders 59 and 61 are feedback to the accumulator registers 56 and added to the next values that are stored in the adder input registers 57. Final accumulator values are output from the first and the second MAC adders 59 and 61, sent to the MAC output selector 66, and eventually out of the dual MAC via the first dual MAC outputs 21.

Figure 3:
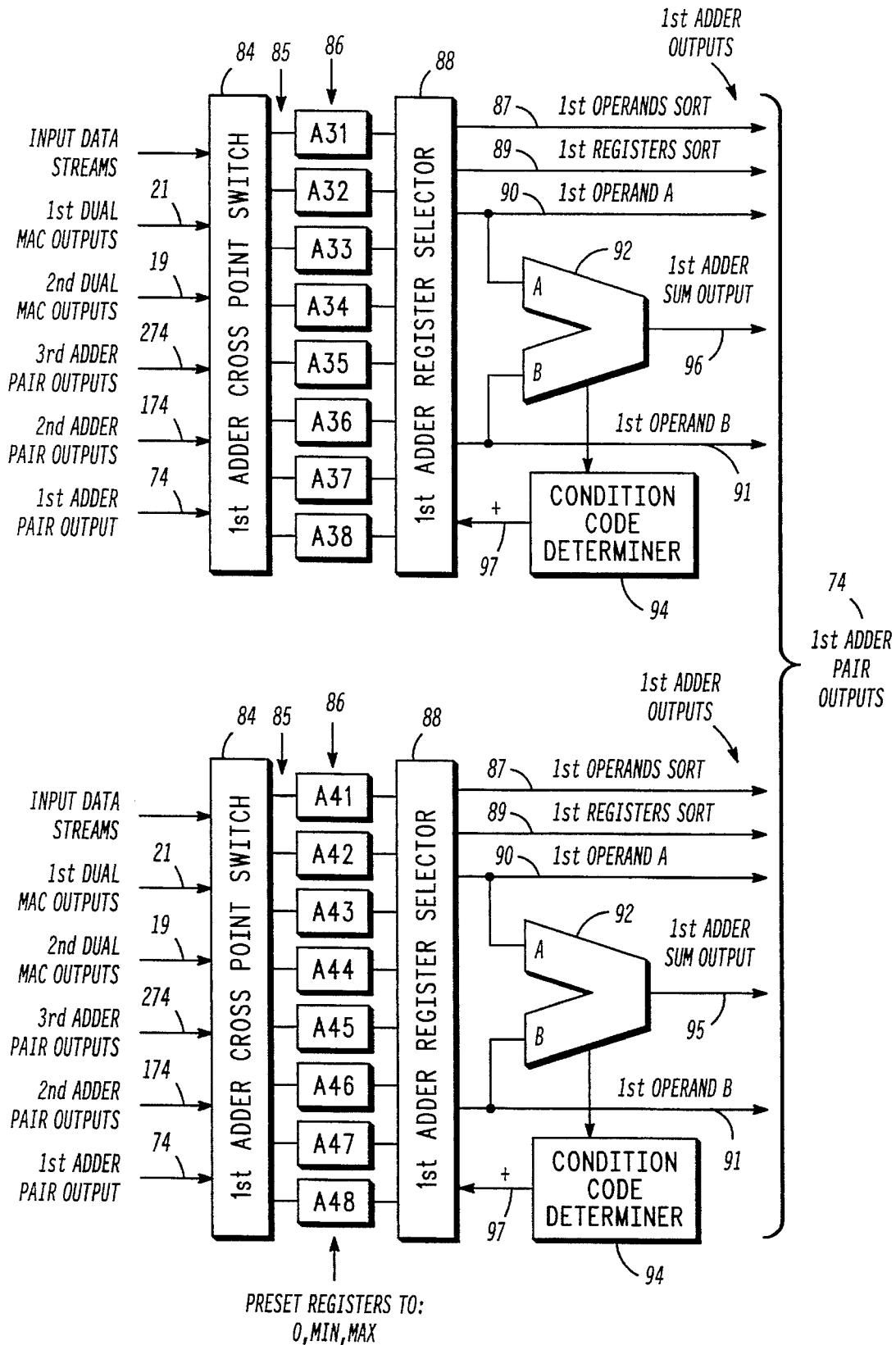
In FIG. 3, there is shown a first pair of adders suitable for the adder array shown in FIG. 1.

FIG. 3 illustrates a first pair of adders suitable for the adder array 14 shown in FIG. 1. The first rank of adders in FIG. 3 comprises a pair of cross point switches 84, register files 86, register selectors 88, adders 92 and condition code determiners 94. The cross point switches 84 accept input data streams to the arithmetic engine, outputs from the first dual MAC 21, and outputs from the second dual MAC 19. In addition to accepting external data, the cross point switches accept arithmetic engine output data. Outputs from the first, the second, and the third adder pairs, 74, 174, and 274, respectively, are feedback to the first adder cross point switches 84. The selected values 85 from the cross point switch 84 are stored in the first adder registers 86. There must be at least eight registers in front of each adder 92 to efficiently perform a radix 8 butterfly algorithm. These registers buffer output data until it can be used by the adder. The need for buffering occurs because the input sequence of data does not match the sequence in which the data is consumed.

First adder operand A 90 and first operand B 91 in FIG. 3 are selected by the first adder register selector 88 from first adder registers 86 for use by the first adders 92. Adders 92 can perform add or subtract operation. The first adder selectors 88 are also responsible for performing a sort operation as follows. First adder operands 90 and 91 are compared by first adder 92. The sign of the result indicates which operand was larger. The sign of the result is determined by the condition code determiner 94 which feeds back the sort register select signal 97 to the first adder register selector 88. This signal is used to select which operand 90 or 91 is output as the first operand sort 87. In addition, the signal is used to select which value is output as first register sort 89 from a register pair which are not compared. These connections allow a sort chain to be established which can, in the preferred embodiment described, locate the five highest values (peak search) in one pass of the data through the arithmetic engine. The value of the peaks are on first operands sort 87 while the locations of the peaks are on first registers sort 89.

Figure 4:
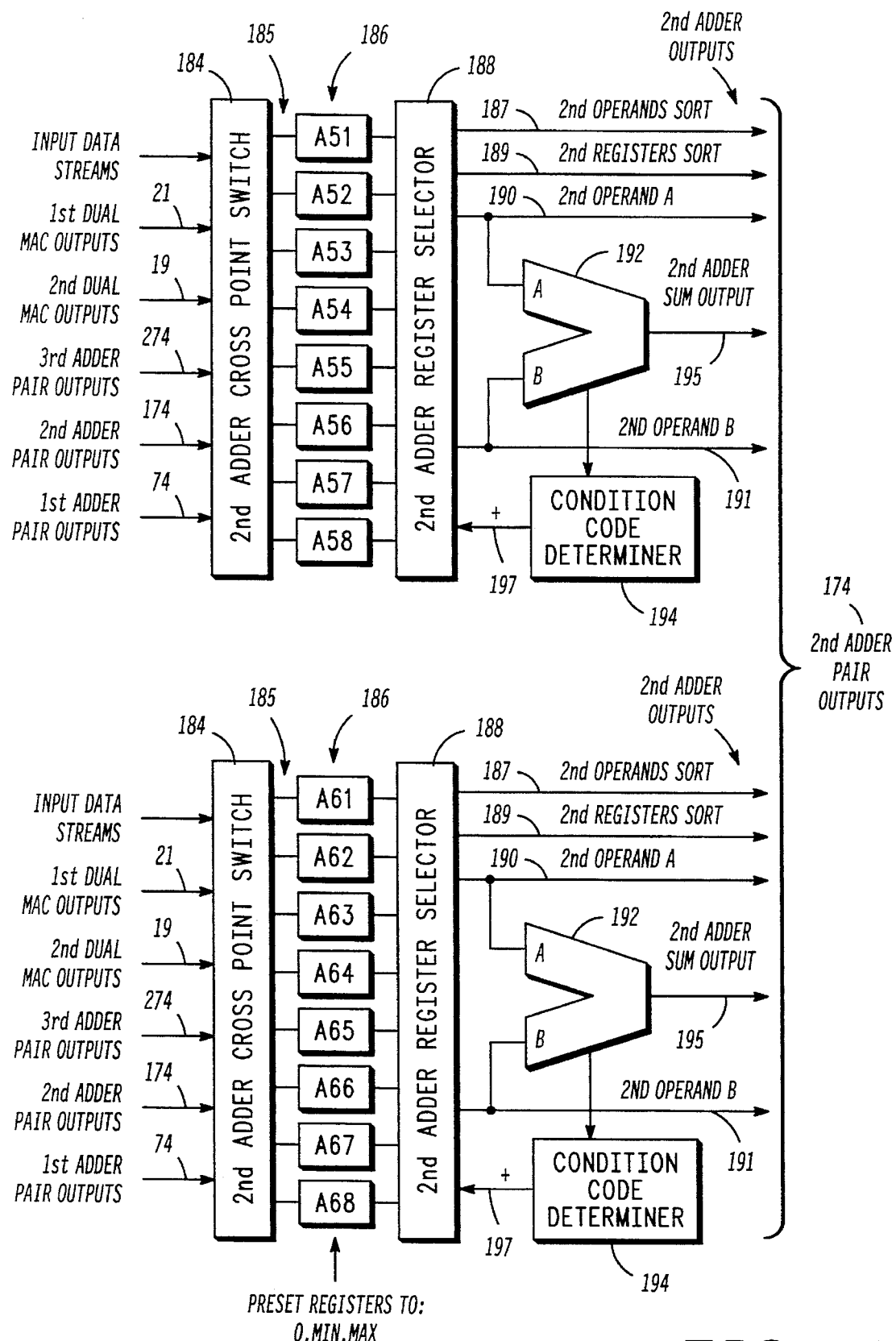
In FIG. 4, there is shown a second pair of adders suitable for the adder array shown in FIG. 1; and In FIG. 5, there is shown a third pair of adders suitable for the adder array shown in FIG. 1.

FIG. 4 illustrates a second pair of adders suitable for the adder array 14 shown in FIG. 1. The second pair of adders in FIG. 4 comprises a pair of cross point switches 184, register files 186, register selectors 188, adders 192 and condition code determiners 194. The cross point switches 184 accept input data streams to the arithmetic engine, outputs from the first dual MAC 21, and outputs from the second dual MAC 19. In addition to accepting external data, the cross point switches accept arithmetic engine output data. Outputs from the first, the second, and the third adder pairs, 74, 174, and 274, respectively, are feedback to the second adder cross point switches 184. The selected values 185 from the cross point switch 184 are stored in the second adder registers 186. Second adder operand A 190 and second operand B 191 are selected by the second adder register selector 188 from second adder registers 186 for use by the second adders 192. Adders 192 can perform add or subtract operation. The second adder selectors 188 are also responsible for performing the sort operation. Second adder operands 190 and 191 are compared by second adder 192. The sign of the result indicates which operand was larger. The sign of the result is determined by the condition code determiner 194 which feeds back the sort register select signal 197 to the second adder register selector 188. This signal is used to select which operand 190 or 191 is output as the second operand sort 187. In addition, the signal is used to select which value is output as second register sort 189 from a register pair which are not compared. These connections allow a sort chain to be established which can, in the preferred embodiment described, locate the five highest values (peak search) in one pass of the data through the arithmetic engine. The value of the peaks are on second operands sort 187 while the locations of the peaks are on second registers sort 189.

Figure 5:
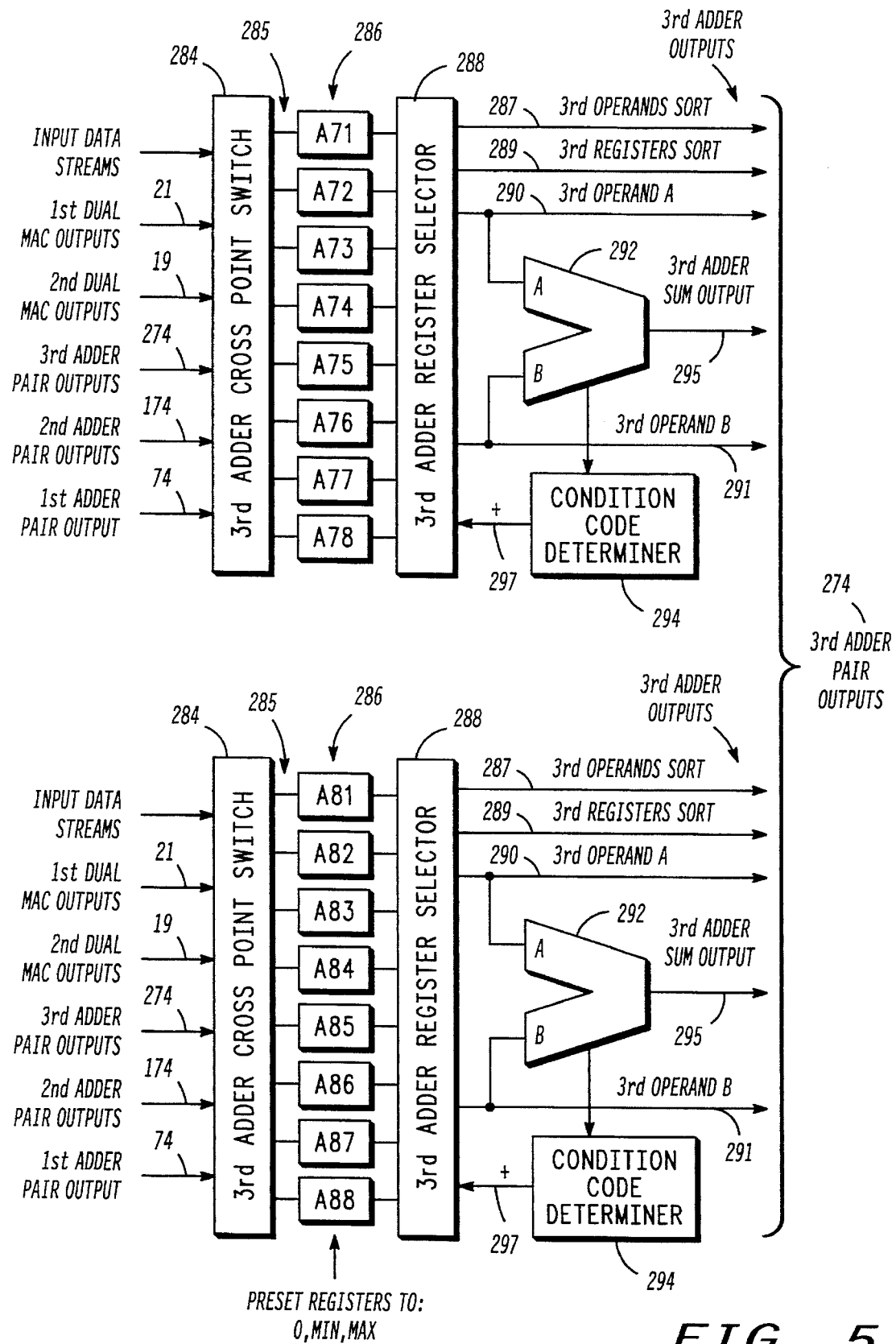

FIG. 5 illustrates a third pair of adders suitable for the adder array 14 shown in FIG. 1. The third pair of adders in FIG. 5 comprises a pair of cross point switches 284, register files 286, register selectors 288, adders 292 and condition code determiners 294. The cross point switches 284 accept input data streams to the arithmetic engine, outputs from the first dual MAC 21, and outputs from the second dual MAC 19. In addition to accepting external data, the cross point switches accept arithmetic engine output data. Outputs from the first, the second, and the third adder pairs, 74, 174, and 274, respectively, are feedback to the first adder cross point switches 284. The selected values 285 from the cross point switch 284 are stored in the third adder registers 286. Third adder operand A 290 and third operand B 291 are selected by the third adder register selector 288 from third adder registers 286 for use by the third adders 292. Adders 292 can perform add or subtract operation. The third adder selectors 288 are also responsible for performing the sort operation. Third adder operands 290 and 291 are compared by third adder 292. The sign of the result indicates which operand was larger. The sign of the result is determined by the condition code determiner 294 which feeds back the sort register select signal 297 to the third adder register selector 288. This signal is used to select which operand 290 or 291 is output as the third operand sort 287. In addition, the signal is used to select which value is output as third register sort 289 from a register pair which are not compared. These connections allow a sort chain to be established which can, in the preferred embodiment described, locate the five highest values (peak search) in one pass of the data through the arithmetic engine. The value of the peaks are on third operands sort 287 while the locations of the peaks are on third registers sort 289.

As an example illustrating how the dual MACs 12 and 13 in FIG. 1 work with the adder array 14, a description of the radix 8 butterfly will be given. The radix 8 butterfly function acts on eight complex numbers producing eight complex outputs. Data passes through the FIG. 2 dual multipliers 30, dual accumulator 34, and each rank of the adder arrays 95, 195, 295 in FIG. 3 using all of the resources of the arithmetic engine each instruction. During each instruction, a complex multiply is performed in dual MACs 12 and 13 and six add operations occur in the adder array 14 (add or subtract). Twelve instructions are required to fill the arithmetic engine 11 registers with data and produce the first output. After arithmetic engine pipeline is full, output data is produced every instruction, as can be seen in the detailed description below.

This detailed discussion of how data is sequenced through the arithmetic engine during a radix 8 butterfly refers to Table 1, Radix 8 Pipeline Sequence. Table 1 shows how data is transferred from register to register for each instruction. Data enters the arithmetic engine at the dual MAC cross point switch 42 in FIG. 2 and is stored in the multiplier input registers 46. There are four registers assigned to each multiplier. Registers M11–M14 are assigned to first parallel multiplier 52. Registers M21–M24 are assigned to second parallel multiplier 54 of the first dual MAC 12. Registers M31–M34 and M41–M44 are assigned to the multipliers of the second dual MAC 13. Input data consists of complex data samples X7, Y7 and complex coefficients Zx7, Zy7. Instruction 1 loads eight registers simultaneously through the cross point switch (M11, M41, M21, M31, M13, M33, M23, M43).

Instruction 2 loads the next complex data pair (X6,Y6), (Zx3,Zy3) into the multiplier registers 46 and multiplies data from the previous fetch and stores it into the adder input registers 57, which are designated A11, A12 for the first dual Mac 12 and A21, A22 for the second dual MAC 13.

Instruction 3 fetches the third complex pair (X5,Y5) (Zx5,Zy5) and completes the complex multiply of the first data sample by adding and subtracting the previous adder input registers 57 (A11, A12, A21, A22). The results are stored in the first adder registers 86 of the adder array 14 (A38,A48) (in FIG. 3).

TABLE 1

RADIX 8, 8 CYCLE BUTTERFLY PIPEFILL SEQUENCE

| Input to MAC | Output of Multiplier | Output of MAC | Output of 1st Adder Pair | Output of 2nd Adder Pair | Output of 3rd Adder Pair |
|---|---|---|---|---|---|
| Instruction #: 1 | | | | | |
| X7→M11,M41 | | | | | |
| Y7→M21,M31 | | | | | |
| Zx7→M13,M33 | | | | | |
| Zy7→M23,M43 | | | | | |
| Instruction #: 2 | | | | | |
| X6→M11,M41 | M11*M13→A11 | | | | |
| Y6→M21,M31 | M21*M23→A12 | | | | |
| Zx3→M13,M33 | M31*M33→A21 | | | | |
| Zy3→M23,M43 | M41*M43→A22 | | | | |
| Instruction #: 3 | | | | | |
| X5→M11,M41 | M11*M13→A11 | A11+A12→A38 | | | |
| Y5→M21,M31 | M21*M23→A12 | A21−A22→A48 | | | |
| Zx5→M13,M33 | M31*M33→A21 | | | | |
| Zy5→M23,M43 | M41*M43→A22 | | | | |
| Instruction #: 4 | | | | | |
| X4→M11,M41 | M11*M13→A11 | A11+A12→A34 | | | |
| Y4→M21,M31 | M21*M23→A12 | A21−A22→A44 | | | |
| Zx1→M13,M33 | M31*M33→A21 | | | | |
| Zy1→M23,M43 | M41*M43→A22 | | | | |
| Instruction #: 5 | | | | | |
| X3→M11,M41 | M11*M13→A11 | A11+A12→A37 | A34−A38→M42 | | |
| Y3→M21,M31 | M21*M23→A12 | A21−A22→A47 | A44−A48→M22 | | |
| Zx6→Ml3,M33 | M31*M33→A21 | | | | |
| Zy6→M23,M43 | M41*M43→A22 | | | | |
| Instruction #: 6 | | | | | |
| X2→M11,M41 | M11*M13→A11 | A11+A12→A33 | A34+A38→A57 | | |
| Y2→M21,M31 | M21*M23→A12 | A21−A22→A43 | A44+A48→A67 | | |
| Zx2→M13,M33 | M31*M33→A21 | | | | |
| Zy2→M23,M43 | M41*M43→A22 | | | | |
| Instruction #: 7 | | | | | |
| X1→M11,M41 | M11*M13→A11 | A11+A12→A36 | A33−A37→M12 | | |
| Y1→M21,M31 | M21*M23→A12 | A21−A22→A46 | A43−A47→M32 | | |
| Zx4→M13,M33 | M31*M33→A21 | | | | |
| Zy4→M23,M43 | M41*M43→A22 | | | | |
| Instruction #: 8 | | | | | |
| X0→A31 | M11*M13→A11 | A11+A12→A32 | A33+A37→A53 | | |
| Y0→A41 | M21*M23→A12 | A21−A22→A42 | A43+A47→A63 | | |
| | M31*M33→A21 | | | | |
| | M41*M43→A22 | | | | |
| Instruction #: 9 | | | | | |
| X15→M11,M41 | M14*M12→A11 | A11+A12→A35 | A32+A36→A55 | A53+A57→A75 | |
| Y15→M21,M31 | M24*M22→A12 | A21−A22→A45 | A42+A46→A65 | A63+A67→A85 | |
| Zx7→M13,M33 | M34*M32→A21 | | | | |
| Zy7→M23,M43 | M44*M42→A22 | | | | |

TABLE 1-continued

RADIX 8, 8 CYCLE BUTTERFLY PIPEFILL SEQUENCE

| Input to MAC | Output of Multiplier | Output of MAC | Output of 1st Adder Pair | Output of 2nd Adder Pair | Output of 3rd Adder Pair |
|---|---|---|---|---|---|
| Instruction #: 10 | | | | | |
| X14→M11,M41 | M11*M13→A11 | A11+A12→A54 | A31+A35→A51 | A53−A57→A87 | |
| Y14→M21,M31 | M21*M23→A12 | A11−A12→A64 | A41+A45→A61 | A63−A67→A77 | |
| Zx3→M13,M33 | M31*M33→A21 | A21+A22→A68 | | | |
| Zy3→M23,M43 | M41*M43→A22 | A21−A22→A58 | | | |
| Instruction #: 11 | | | | | |
| X13→M11,M41 | M11*M13→A11 | A11+A12→A38 | A32−A36→A66 | A51+A55→A71 | |
| Y13→M21,M31 | M21*M23→A12 | A21−A22→A48 | A42−A46→A56 | A61+A65→A81 | |
| Zx5→M13,M33 | M31*M33→A21 | | | | |
| Zy5→M23,M43 | M41*M43→A22 | | | | |
| Instruction #: 12 | | | | | |
| X12→M11,M41 | M11*M13→A11 | A11+A12→A34 | A31−A35→A52 | A51−A55→A73 | |
| Y12→M21,M31 | M21*M23→A12 | A21−A22→A44 | A41−A45→A62 | A61−A65→A83 | |
| Zx1→M13,M33 | M31*M33→A21 | | | | |
| Zy1→M23,M43 | M41*M43→A22 | | | | |
| Instruction #: 13 | | | | | |
| X11→M11,M41 | M11*M13→A11 | A11+A12→A37 | A34−A38→M42 | A54−A58→A86 | A71+A75→X0 |
| Y11→M21,M31 | M21*M23→A12 | A21−A22→A47 | A44−A48→M22 | A64−A68→A78 | A81+A85→Y0 |
| Zy6→M13,M33 | M31*M33→A21 | | | | |
| Zy6→M23,M43 | M41*M43→A22 | | | | |
| Instruction #: 14 | | | | | |
| X10→M11,M41 | M11*M13→A11 | A11+AI2→A33 | A34+A38→A57 | A54+A58→A76 | A71−A75→X4 |
| Y10→M21,M31 | M21*M23→A12 | A21−A22→A43 | A44+A48→A67 | A64+A68→A88 | A81−A85→Y4 |
| Zx2→M13,M33 | M31*M33→A21 | | | | |
| Zy2→M23,M43 | M41*M43→A22 | | | | |
| Instruction #: 15 | | | | | |
| X9→M11,M41 | M11*M13→A11 | A11+A12→A36 | A33−A37→M12 | A52+A56→A72 | A73+A77→X2 |
| Y9→M21,M31 | M21*M23→A12 | A21−A22→A46 | A43−A47→M32 | A62+A66→A84 | A83−A87→Y2 |
| Zx4→M13,M33 | M31*M33→A21 | | | | |
| Zy4→M23,M43 | M41*M43→A22 | | | | |
| Instruction #: 16 | | | | | |
| X8→A31 | M11*M13→A11 | A11+A12→A32 | A33+A37→A53 | A52−A56→A74 | A73−A77→X6 |
| Y8→A41 | M21*M23→A12 | A21−A22→A42 | A43+A47→A63 | A62−A66→A82 | A83+A87→Y6 |
| | M31*M33→A21 | | | | |
| | M41*M43→A22 | | | | |
| Instruction #: 17 | | | | | |
| X23→M11,M41 | M14*M12→A11 | A11+A12→A35 | A32+A36→A55 | A53+A57→A75 | A72+A76→X1 |
| Y23→M21,M31 | M24*M22→A12 | A21−A22→A45 | A42+A46→A65 | A63+A67→A85 | A82−A86→Y1 |
| Zx7→M13,M33 | M34*M32→A21 | | | | |
| Zy7→M23,M43 | M44*M42→A22 | | | | |
| Instruction #: 18 | | | | | |
| X22→M11,M41 | M14*M12→A11 | A11+A12→A54 | A31+A35→A51 | A53−A57→A87 | A72−A76→X5 |
| Y22→M21,M31 | M24*M22→A12 | A11−A12→A64 | A41+A45→A61 | A63−A67→A77 | A82−A86→Y5 |
| Zx3→M13,M33 | M34*M32→A21 | A21+A22→A68 | | | |
| Zy3→M23,M43 | M44*M42→A22 | A21−A22→A58 | | | |
| Instruction #: 19 | | | | | |
| X21→M11,M41 | M14*M12→A11 | A11+A12→A38 | A32−A36→A66 | A51 +A55→A71 | A74−A78→X3 |
| Y21→M21,M31 | M24*M22→A12 | A21−A22→A48 | A42−A46→A56 | A61 +A65→A81 | A84−A88→Y3 |
| Zx5→M13,M33 | M34*M32→A21 | | | | |
| Zy5→M23,M43 | M44*M42→A22 | | | | |
| Instruction #: 20 | | | | | |
| X20→M11,M41 | M14*M12→A11 | A11+A12→A34 | A31−A35→A52 | A51−A55→A73 | A74+A78→X7 |
| Y20→M21,M31 | M24*M22→A12 | A21−A22→A44 | A41−A45→A62 | A61−A65→A83 | A84+A88→Y7 |
| Zx1→M13,M33 | M34*M32→A21 | | | | |
| Zy1→M23,M43 | M44*M42→A22 | | | | |
| Instruction #: 21 | | | | | |
| X19→M11,M41 | M14*M12→A11 | A11+A12→A37 | A34−A38→M42 | A54−A58→A86 | A71+A75→X8 |
| Y19→M21,M31 | M24*M22→A12 | A21−A22→A47 | A44−A48→M22 | A64−A68→A78 | A81+A85→Y8 |
| Zx6→M13,M33 | M34*M32→A21 | | | | |
| Zy6→M23,M43 | M44*M42→A22 | | | | |

TABLE 1-continued

RADIX 8, 8 CYCLE BUTTERFLY PIPEFILL SEQUENCE

| Input to MAC | Output of Multiplier | Output of MAC | Output of 1st Adder Pair | Output of 2nd Adder Pair | Output of 3rd Adder Pair |
|---|---|---|---|---|---|
| Instruction #: 22 | | | | | |
| X18→M11,M41 | M14*M12→A11 | A11+A12→A33 | A34+A38→A57 | A54+A58→A76 | A71−A75→X12 |
| Y18→M21,M31 | M24*M22→A12 | A21−A22→A43 | A44+A48→A67 | A64+A68→A88 | A81−A85→Y12 |
| Zx2→M13,M33 | M34*M32→A21 | | | | |
| Zy2→M23,M43 | M44*M42→A22 | | | | |
| Instruction #: 23 | | | | | |
| X17→M11,M41 | M14*M12→A11 | A11+A12→A36 | A33−A37→M12 | A52+A56→A72 | A73+A77→X10 |
| Y17→M21,M31 | M24*M22→A12 | A21−A22→A46 | A43−A47→M32 | A62+A66→A84 | A83−A87→Y10 |
| Zx4→M13,M33 | M34*M32→A21 | | | | |
| Zy4→M23,M43 | M44*M42→A22 | | | | |

Instruction 4 fetches the fourth complex pair (X4,Y4) (Zx1,Zy1), completes the complex multiply of the second sample by adding and subtracting the previous adder input registers 57, and stores the results in the first adder registers 86 of the adder array 14 (A34, A44).

Instruction 5 fetches the fifth complex pair (X3,Y3) (Zx6,Zy6), completes the complex multiply of the third sample, and stores the results in the first adder registers 86 (A37, A47). The previous values loaded into the first adder registers in instructions 3 and 4 (A34, A38, A44, A48) are subtracted and stored back in the dual MAC multiplier registers 46 (M42, M22) to be used later in instruction 9. This instruction demonstrates the feedback properties of the arithmetic engine. The feedback is applied to maintain complete utilization of the arithmetic engine resources while calculating the radix 8 butterfly.

Instruction 6 fetches the sixth complex pair (X2,Y2) (Zx2,Zy2), completes the complex multiply of the fourth sample, and stores the results in the first adder registers 86 (A33, A43). The values loaded into the first adder registers in instructions 3 and 4 (A34, A38, A44, A48) are added and stored in the second adder registers 186 of the second rank adder block (FIG. 4 A57 and A67).

Instruction 7 fetches the seventh complex pair (X1,Y1) (Zx4,Zy4), completes the complex multiply of the fifth sample, and stores the results in the first adder registers 86 (A36, A46). The previous values loaded into the first adder registers in instructions 5 and 6 (A33, A37, A43, A47) are subtracted and stored back in the dual MAC multiplier registers 46 (M12, M32) to be used later in instruction 9. This instruction again demonstrates the feedback properties of the arithmetic engine.

Instruction 8 fetches the pair (X0,Y0) and stores them directly into A31 and A41 of the first adder registers 86. The complex multiply of the sixth sample is completed, and the values loaded into the first adder registers in instruction 5 and 6 (A33, A37, A43, A47) are added and loaded into the second adder registers 186 (A53, A63).

Instruction 9 fetches the ninth complex pair (X15,Y15) (Zx7,Zy7), completes the complex multiply of the seventh instruction, adds the previous values of the first adder registers in instruction 7 and 8 (A32, A36, A42, A46) and loads them into the second adder registers 186 (A55, A65). The previous values loaded in the second adder registers in instruction 6 and 8 (A53, A57, A63, A67) are added and stored in the third adder registers 286 (FIG. 5 A75 and A85). This same process continues through instruction 12.

After instruction 12, the pipeline is full and the final results of the radix eight butterfly are available beginning with instruction 13. Instruction 13 operates like instruction 9 through 12 with the exception of a final operation. Instruction 13 takes the previous values loaded into the third adder registers 286 in instructions 9 and 11 (A71, A75, A81, A85), adds them together, and sends the result (X0, Y0) to memory. This result is the first output value of the radix 8 butterfly. Instruction 14 outputs the second result (X4, Y4) and the process continues for a single butterfly through instruction 20 where the last value is output (X7, Y7).

In summary, the Fast Fourier Transform is a fundamental signal processing application. The speed at which this transform can be computed often determines which digital signal processor is chosen for a given application. Higher radix butterflies decrease the execution time of the FFT by increasing throughput, provided there are sufficient resources to store intermediary values. The arithmetic engine contemplated here, while optimized for a radix 8 butterfly, can also perform radix 2 and radix 4 butterflies efficiently.

The significance of this arithmetic engine described lies in its architecture. The architecture is designed to input and operate on complex data in ordered pairs. Each adder pair is designed to operate on a complex number. There are three ranks of adder pairs because of the Radix 8 butterfly requirement. The output of the first adder pair 74 provides radix 2 results, the output of the second adder pair 174 provides radix 4 results, and the output of the third adder pair 274 provides radix 8 results.

Another important capability designed into the hardware is high speed data sorting. Most arithmetic engines simply pass data through from the input to the output. The engine described here differs because it recirculates data within the engine by feeding the outputs back to the inputs. This feature allows full use of computing resources and is essential for parallel sorting operations where all of the adders and switches are active. Use of a cross point switch allows any combination of inputs to be loaded simultaneously into any combination of registers. Typically, simple multiplexers are used which only allow one or two registers to be loaded at a time.

Thus, there has also been provided, in accordance with an embodiment of the invention, an arithmetic engine that fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. An arithmetic engine comprising:

a first dual multiplier accumulator (MAC) for receiving input data at a first dual MAC first input and for producing first dual MAC output data at a first dual MAC output, wherein the first dual MAC comprises:

a dual multiplier for receiving a plurality of sources and for producing first and second parallel multiplier outputs, the dual multiplier including a multiplier cross point switch for receiving the plurality of sources and for producing selected sources at a plurality of multiplier cross point switch outputs, wherein the dual multiplier comprises:

a plurality of multiplier registers coupled to the multiplier cross point switch outputs, the plurality of multiplier registers for storing the selected sources as multiplier register values;

a register selector coupled to the plurality of multiplier registers, the register selector for choosing selected multiplier operands from the multiplier register values; and first and second parallel multipliers coupled to the register selector, the first and the second parallel multipliers for receiving pairs of selected multiplier operands and multiplying the pairs of selected multiplier operands to produce the first and the second parallel multiplier outputs, respectively;

an accumulator coupled to the dual multiplier, the accumulator for receiving the first and second parallel multiplier outputs, selecting particular first and second parallel multiplier outputs in a condition code determiner, and for producing the first dual MAC output data therefrom, the accumulator comprising:

a plurality of adder registers for storing the first and the second parallel multiplier outputs and a plurality of accumulator registers for storing a first and a second accumulator output;

an accumulator cross point switch coupled to the plurality of adder registers and the plurality of accumulator registers, the accumulator cross point switch for producing selected accumulator register and adder register values from the first and the second parallel multiplier outputs and the first and the second accumulator outputs;

first and second parallel MAC adders coupled to the accumulator cross point switch, the first and the second parallel MAC adders for receiving pairs of selected accumulator register and adder register values and adding the pairs of selected accumulator register and adder register values to produce the first and the second accumulator adder outputs; and a MAC output selector coupled to the first and to the second parallel MAC adders and to the first and to the second parallel multipliers, the MAC output selector for receiving the first and the second accumulator outputs and the first and the second parallel multiplier outputs and for producing the first dual MAC output data; and a first dual MAC second input;

a second dual MAC coupled in parallel to the first dual MAC, the second dual MAC for receiving the input data at a second dual MAC first input and for producing second dual MAC output data at a second dual MAC output, wherein the second dual MAC comprises a second dual MAC second input; and an adder array coupled to both the first dual MAC and to the second dual MAC, the adder array for receiving the input data, the first dual MAC output data, and the second dual MAC output data and for producing arithmetic engine output data at an adder array output, wherein the first dual MAC second input is coupled to the adder array output, the first dual MAC output is coupled to the adder array output, the second dual MAC second input is coupled to the adder array output, and the second dual MAC output is coupled to the adder array output.

2. An arithmetic engine as claimed in claim 1, wherein the second parallel MAC adder produces a condition code input to the condition code determiner, and the condition code determiner produces a condition code output to the MAC output selector.

3. An arithmetic engine as claimed in claim 1, wherein the adder array comprises:

a first adder pair for receiving the input data, the first dual MAC output data, the second dual MAC output data and first, second, and third adder pair outputs, and for producing first adder pair outputs;

a second adder pair coupled to the first adder pair, the second adder pair for receiving the input data, the first dual MAC output data, the second dual MAC output data, and the first, the second, and the third adder pair outputs and for producing second adder pair outputs; and a third adder pair coupled to the second adder pair, the third adder pair for receiving the input data, the first dual MAC output data, the second dual MAC output data, and the first, the second, and the third adder pair outputs and for producing the arithmetic engine output data at the adder array output.

4. An arithmetic engine as claimed in claim 3, wherein each adder of the first adder pair comprises:

a first adder cross point switch for producing first selected values of the input data, the first MAC output data, the second MAC output data and the first, the second, and the third adder pair outputs;

first adder registers coupled to the first adder cross point switch, the first registers for storing the first selected values;

a first adder register selector coupled to the first adder registers, the first adder register selector for receiving and choosing first operands and for producing a first adder sum output from the first selected values;

a first adder coupled to the first adder register selector, the first adder for receiving and adding the first operands and for producing one of the first adder pair outputs; and a first condition code determiner for receiving a first adder condition code input and for providing a first condition code to the first adder register selector.

5. An arithmetic engine as claimed in claim 3, wherein each adder of the second adder pair comprises:

a second adder cross point switch for producing second selected values of the input data, the first dual MAC output data, the second dual MAC output data, and the first, the second, and the third adder pair outputs;

second adder registers coupled to the second adder cross point switch, the second adder registers for storing the second selected values;

a second adder register selector coupled to the second adder registers, the second adder register/selector for receiving and choosing second operands from the second selected values;

a second adder coupled to the second adder register selector, the second adder for receiving and adding the second operands and for producing one of the second adder pair outputs; and a second condition code determiner for receiving a second adder condition code input and for providing a second condition code to the second adder register selector.

6. An arithmetic engine as claimed in claim 3, wherein each adder of the third adder pair comprises:

a third adder cross point switch for producing third selected values of the input data, the first dual MAC output data, the second dual MAC output data, and the first, the second and the third adder pair outputs;

third adder registers coupled to the third adder cross point switch, the third adder registers for storing the third selected values;

a third adder register selector coupled to the third adder registers, the third adder register selector for receiving and choosing third operands from the third selected values;

a third adder coupled to the third adder register selector, the third adder for receiving and adding the third operands and for producing the arithmetic engine output data; and a third condition code determiner for receiving a third condition code input and for providing a third condition code to the third adder register selector.

7. A complex arithmetic processor including an arithmetic engine comprising:

a first dual multiplier accumulator (MAC) for receiving input data at a first dual MAC first input and for producing first dual MAC output data at a first dual MAC output, wherein the first dual MAC comprises:

a dual multiplier for receiving a plurality of sources and for producing first and second parallel multiplier outputs, the dual multiplier including a multiplier cross point switch for receiving the plurality of sources and for producing selected sources at a plurality of multiplier cross point switch outputs, wherein the dual multiplier comprises:

a plurality of multiplier registers coupled to the multiplier cross point switch outputs, the plurality of multiplier registers for storing the selected sources as multiplier register values;

a register selector coupled to the plurality of multiplier registers, the register selector for choosing selected multiplier operands from the multiplier register values; and first and second parallel multipliers coupled to the register selector, the first and the second parallel multipliers for receiving pairs of selected multiplier operands and multiplying the pairs of selected multiplier operands to produce the first and the second parallel multiplier outputs, respectively;

an accumulator coupled to the dual multiplier, the accumulator for receiving the first and second parallel multiplier outputs, selecting particular first and second parallel multiplier outputs in a condition code determiner, and for producing the first dual MAC output data therefrom, wherein the accumulator comprises:

a plurality of adder registers for storing the first and the second parallel multiplier outputs and a plurality of accumulator registers for storing a first and a second accumulator output;

an accumulator cross point switch coupled to the plurality of adder registers and the plurality of accumulator registers, the accumulator cross point switch for producing selected accumulator register and adder register values from the first and the second parallel multiplier outputs and the first and the second accumulator outputs;

first and second parallel MAC adders coupled to the accumulator cross point switch, the first and the second parallel MAC adders for receiving pairs of selected accumulator register and adder register values and adding the pairs of selected accumulator register and adder register values to produce the first and the second accumulator adder outputs; and a MAC output selector coupled to the first and to the second parallel MAC adders and to the first and to the second parallel multipliers, the MAC output selector for receiving the first and the second accumulator outputs and the first and the second parallel multiplier outputs and for producing the first dual MAC output data;

a first dual MAC second input;

a second dual MAC coupled in parallel to the first dual MAC, the second dual MAC for receiving the input data at a second dual MAC first input and for producing second dual MAC output data at a second dual MAC output, wherein the second dual MAC comprises a second dual MAC second input; and an adder array coupled to both the first dual MAC and to the second dual MAC, the adder array for receiving the input data, the first dual MAC output data, and the second dual MAC output data and for producing arithmetic engine output data at an adder array output, wherein the first dual MAC second input is coupled to the adder array output, the first dual MAC output is coupled to the adder array output, the second dual MAC second input is coupled to the adder array output, and the second dual MAC output is coupled to the adder array output.

8. A complex arithmetic processor as claimed in claim 7, wherein the second parallel MAC adder produces a condition code input to the condition code determiner, and the condition code determiner produces a condition code output to the MAC output selector.

9. A complex arithmetic processor as claimed in claim 7, wherein the adder array comprises:

a first adder pair for receiving the input data, the first dual MAC output data, the second dual MAC output data and first, second, and third adder pair outputs, and for producing first adder pair outputs;

a second adder pair coupled to the first adder pair, the second adder pair for receiving the input data, the first dual MAC output data, the second dual MAC output data, and the first, the second, and the third adder pair outputs and for producing second adder pair outputs; and a third adder pair coupled to the second adder pair, the third adder pair for receiving the input data, the first dual MAC output data, the second dual MAC output data, and the first, the second, and the third adder pair outputs and for producing the arithmetic engine output data at the adder array output.

10. A complex arithmetic processor as claimed in claim 9, wherein each adder of the first adder pair comprises:

- a first adder cross point switch for producing first selected values of the input data, the first MAC output data, the second MAC output data and the first, the second, and the third adder pair outputs;
- first adder registers coupled to the first adder cross point switch, the first registers for storing the first selected values;
- a first adder register selector coupled to the first adder registers, the first adder register selector for receiving and choosing first operands and for producing a first adder sum output from the first selected values;
- a first adder coupled to the first adder register selector, the first adder for receiving and adding the first operands and for producing one of the first adder pair outputs; and
- a first condition code determiner for receiving a first adder condition code input and for providing a first condition code to the first adder register selector.

11. A complex arithmetic processor as claimed in claim 9, wherein each adder of the second adder pair comprises:

- a second adder cross point switch for producing second selected values of the input data, the first dual MAC output data, the second dual MAC output data, and the first, the second, and the third adder pair outputs;
- second adder registers coupled to the second adder cross point switch, the second adder registers for storing the second selected values;
- a second adder register selector coupled to the second adder registers, the second adder register selector for receiving and choosing second operands from the second selected values;
- a second adder coupled to the second adder register selector, the second adder for receiving and adding the second operands and for producing one of the second adder pair outputs; and
- a second condition code determiner for receiving a second adder condition code input and for providing a second condition code to the second adder register selector.

12. A complex arithmetic processor as claimed in claim 9, wherein each adder of the third adder pair comprises:

- a third adder cross point switch for producing third selected values of the input data, the first dual MAC output data, the second dual MAC output data, and the first, the second and the third adder pair outputs;
- third adder registers coupled to the third adder cross point switch, the third adder registers for storing the third selected values;
- a third adder register selector coupled to the third adder registers, the third adder register selector for receiving and choosing third operands from the third selected values;
- a third adder coupled to the third adder register selector, the third adder for receiving and adding the third operands and for producing the arithmetic engine output data; and
- a third condition code determiner for receiving a third condition code input and for providing a third condition code to the third adder register selector.

* * * * *

UNITED STATES PATENT AND TRADEMARK OFFICE
CERTIFICATE OF CORRECTION

PATENT NO. : 5,522,085
DATED : May 28, 1996
INVENTOR(S) : Calvin Wayne Harrison et al.

It is certified that error appears in the above-indentified patent and that said Letters Patent is hereby corrected as shown below:

In column 15, claim 5, line 2, delete "register/selector" and substitute --register selector--.

Signed and Sealed this

Twenty-fourth Day of September, 1996

Attest:

BRUCE LEHMAN

Attesting Officer     Commissioner of Patents and Trademarks